UNITED STATES PATENT OFFICE.

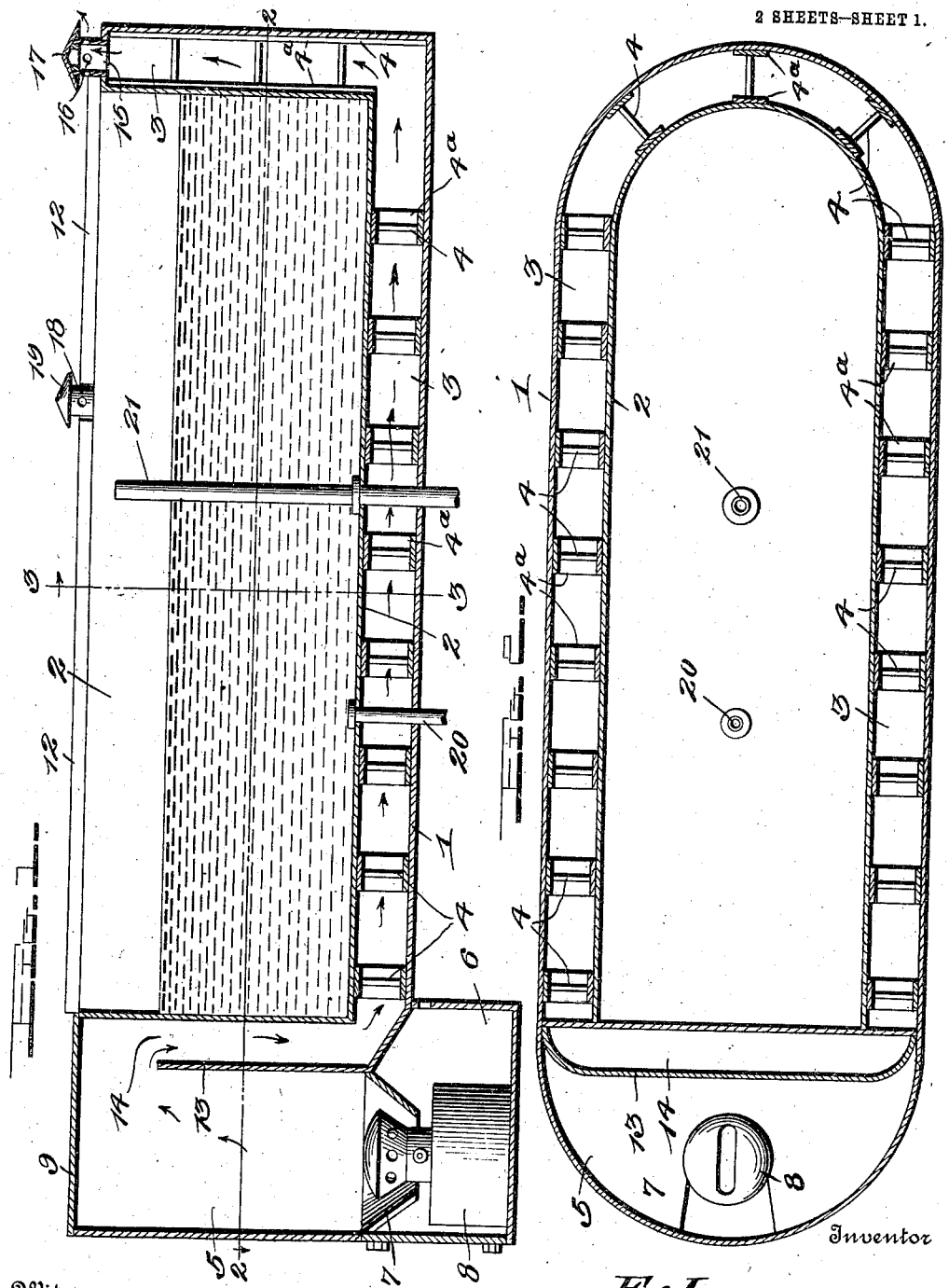

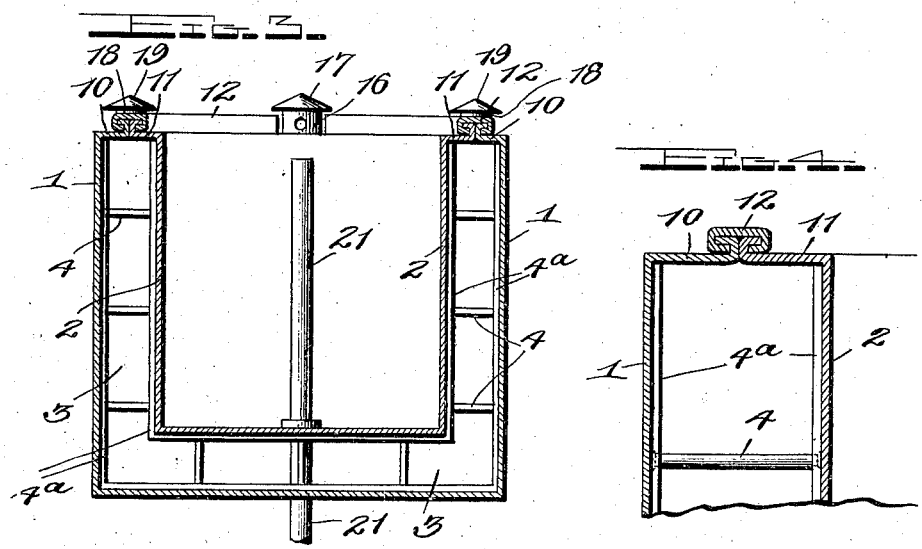

EVAN JAMES, OF WILSONVILLE, NEBRASKA.

TANK.

1,085,685.

Specification of Letters Patent.

Patented Feb. 3, 1914.

Application filed May 12, 1913. Serial No. 767,177.

*To all whom it may concern:*

Be it known that I, EVAN JAMES, a citizen of the United States, residing at Wilsonville, in the county of Furnas and State of Nebraska, have invented certain new and useful Improvements in Tanks; and I do declare the following to be a full, clear, and exact description of the invention, such as will enable others skilled in the art to which it appertains to make and use the same.

This invention relates to improvements in tanks, and particularly to tanks having means for heating the contents thereof.

One object of the invention is to provide a tank of this character which may be constructed in a number of different styles for use as stock and poultry feeding and watering tanks, wagon tanks and the like in which it is desired to keep the contents warm or from freezing.

Another object is to provide a tank having an improved construction and arrangement of heat applying and circulating means whereby all parts of the tank will be uniformly heated.

With these and other objects in view, the invention consists of certain novel features of construction, and the combination and arrangement of parts as will be more fully described and claimed.

In the accompanying drawings: Figure 1 is a central vertical longitudinal section of my improved tank and constructed for use as a stock feeding and watering tank. Fig. 2 is a horizontal section of the tank taken on the line 2—2 of Fig. 1; Fig. 3 is a vertical cross section taken on the line 3—3 of Fig. 1; Fig. 4 is an enlarged detail sectional view through the upper ends of the side walls of the tank showing more clearly the manner in which the inwardly turned upper edges of the sides of the inner and outer tanks are connected to form an air-tight joint.

My improved tank comprises an outer member or casing 1 and an inner member or tank 2 of less size than and arranged in the outer member to form between said members a continuous heat receiving space 3 as shown. The inner and outer members of the tank are braced and held in spaced relation by series of short bracing bolts or rods 4 of which there are any suitable number, said rods or bolts having their ends headed in or secured in frames 4ª arranged between the sides and bottoms of the tank and casing in any suitable manner.

Arranged on one end of the outer member 1 of the tank is a heating compartment 5 on the lower end of which is a lamp compartment 6, said heating compartment and lamp compartment being separated by a partition 7 which inclines from the sides to the center of the compartment and has therein an opening to receive the burner of the lamp 8 in the lamp compartment. The lamp compartment is provided with a suitable door to permit the insertion and removal of the lamp when desired. The upper end of the heating compartment 5 is covered or closed as at 9 and the upper edges of the sides and opposite end of the inner and outer members of the tank are turned inwardly to form right angular flanges 10 and 11 the edges of which are upset to form an interlocking engagement with the upset edges of a connecting strip 12 which binds the edges of the flanges 10 and 11 together over the space 3 between the sides and end of the members 1 and 2 of the tank and forms an air-tight closure for this space. The end 13 of the casing adjacent to the heating compartment terminates short of or does not extend to the top of the tank and thereby forms between its upper edge and the cover 9 of the heating compartment 5 a passage 14 through which the heat from said compartment enters the space 3 between the inner and outer members of the tank. The outer end of the heating compartment 5 as well as the opposite end of the members of the tank may be round or square as desired.

In the flanges 10 and 11 at the opposite end of the tank from the heating compartment is formed a draft opening or flue 15 with which is engaged a short pipe 16 which is preferably provided with a spaced cap or cover plate 17 which protects the open upper end of the pipe and prevents foreign matter from passing therethrough into the space between the members of the tank. In addition to the draft opening or flue 15 at the end of the tank, similar draft flues 18 having protecting caps 19 may be arranged at suitable positions in the flanges 10 and 11 over the spaces between the sides of the tank members as shown. By providing the flues 15 and 18 it will be seen that a strong draft or suction will be produced through the space between the members of the tank thereby drawing the heat generated in the heating compartment 5 by the lamp 8 through the continuous space 3 between the inner and outer members of the tank as will be readily understood.

The tank is provided in its lower side preferably between the center and one end thereof with an inlet pipe 20 which extends through the bottoms of the inner and outer members of the tank and has its ends rigidly secured in said members when the tank is employed as a water tank. The pipe 20 may be connected with a water supply pipe from a pump or other source of water supply. Also arranged through the bottoms of the inner and outer members of the tank and spaced a short distance from the inlet pipe is an outlet or overflow pipe 21 which extends through the bottoms of the members of the tank and upwardly into the inner tank to a distance equal to the depth of the fluid therein, which when run into the tank above the height of the pipe 21 will overflow therethrough and will be thus discharged from the tank.

As hereinbefore described the tank may be employed for various purposes, such as for feeding or watering stock of all kinds, as a wagon tank and for feeding or watering poultry and as the various styles of tanks are of substantially the same construction, an illustration and description of forms or styles other than herein shown and described is not thought to be necessary.

From the foregoing description taken in connection with the accompanying drawings, the construction and arrangement of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

In an article of the character described, the combination of a casing, a tank disposed therein and spaced therefrom, thereby forming a continuous heat circulating space between said casing and tank, means for closing the upper end of said space, a plurality of draft tubes having their lower ends communicating with the latter, a heating compartment attached to one end of said casing, a transversely disposed partition arranged therein, the latter forming an air passage having one end communicating with said compartment, and the opposite end thereof communicating with the heat circulating space, a lamp compartment arranged on the lower end of said heating compartment and communicating therewith, and inlet and overflow pipes arranged through said tank and casing and communicating with the interior of said tank.

In testimony whereof I have hereunto set my hand in presence of two subscribing witnesses.

EVAN JAMES.

Witnesses:
H. G. HEADLEY,
I. N. SEARS.

Copies of this patent may be obtained for five cents each, by addressing the "Commissioner of Patents, Washington, D. C."